US008836851B2

(12) United States Patent
Brunner

(10) Patent No.: US 8,836,851 B2
(45) Date of Patent: Sep. 16, 2014

(54) AUTOMATIC EXPOSURE CONTROL BASED ON MULTIPLE REGIONS

(75) Inventor: Ralph Brunner, Cupertino, CA (US)

(73) Assignee: Apple Inc., Cupertino, CA (US)

(*) Notice: Subject to any disclaimer, the term of this patent is extended or adjusted under 35 U.S.C. 154(b) by 476 days.

(21) Appl. No.: 13/151,165

(22) Filed: Jun. 1, 2011

(65) Prior Publication Data

US 2012/0307107 A1   Dec. 6, 2012

(51) Int. Cl.
*H04N 5/235* (2006.01)
*G03B 7/00* (2006.01)
*H04N 5/238* (2006.01)
*H04N 5/232* (2006.01)

(52) U.S. Cl.
CPC ......... *H04N 5/2351* (2013.01); *H04N 5/23219* (2013.01)
USPC .......................................... 348/364; 348/362

(58) Field of Classification Search
CPC ... H04N 5/232; H04N 5/2351; H04N 5/2353; H04N 5/238
USPC .............. 348/77, 207.99, 362, 363, 364, 365, 348/366
See application file for complete search history.

(56) References Cited

U.S. PATENT DOCUMENTS

| 7,269,292 | B2* | 9/2007 | Steinberg ....................... 382/243 |
| 7,430,333 | B2* | 9/2008 | Yu et al. ........................ 382/254 |
| 7,800,687 | B2* | 9/2010 | Khan et al. .................... 348/362 |
| 8,040,410 | B2* | 10/2011 | Arai et al. ...................... 348/254 |
| 8,208,690 | B2* | 6/2012 | Tokuse .......................... 382/112 |
| 8,319,848 | B2* | 11/2012 | Usui et al. .................... 348/221.1 |
| 2002/0141640 | A1 | 10/2002 | Kraft |
| 2005/0128539 | A1 | 6/2005 | Takano et al. |
| 2006/0088209 | A1* | 4/2006 | Yu et al. ........................ 382/167 |
| 2007/0177050 | A1* | 8/2007 | Xiao et al. .................... 348/371 |
| 2008/0199056 | A1* | 8/2008 | Tokuse .......................... 382/118 |
| 2009/0002514 | A1 | 1/2009 | Steinberg et al. |
| 2009/0135269 | A1 | 5/2009 | Nozaki et al. |
| 2010/0002093 | A1* | 1/2010 | Arai et al. .................... 348/229.1 |
| 2010/0110275 | A1* | 5/2010 | Mathieu ........................ 348/360 |
| 2010/0214429 | A1* | 8/2010 | Usui et al. .................... 348/222.1 |
| 2010/0271499 | A1 | 10/2010 | Steinberg et al. |
| 2012/0002849 | A1* | 1/2012 | Tokuse .......................... 382/118 |

* cited by examiner

*Primary Examiner* — Nicholas Giles
(74) *Attorney, Agent, or Firm* — Wong, Cabello, Lutsch, Rutherford & Brucculeri, LLP

(57) ABSTRACT

Systems, methods, and computer readable media for performing auto-exposure operations in a digital image capture device. An image capture device's auto-exposure settings may be automatically adjusted by generating and then combining, in a dynamically weighted fashion, two sets of exposure values. One set of exposure values may be based on detected faces while the other set may be based on the image as a whole. Each set of exposure values may include a "measured" value and a "target" value, wherein each of these values may, in turn, be based on one or more (different) aspects of the image. Illustrative digital image capture devices in which the disclosed technology may be used include, but are not limited, to portable digital cameras, mobile telephones, personal digital assistants, mobile music and video devices, and portable computer platforms such as notebook and tablet computers.

24 Claims, 10 Drawing Sheets

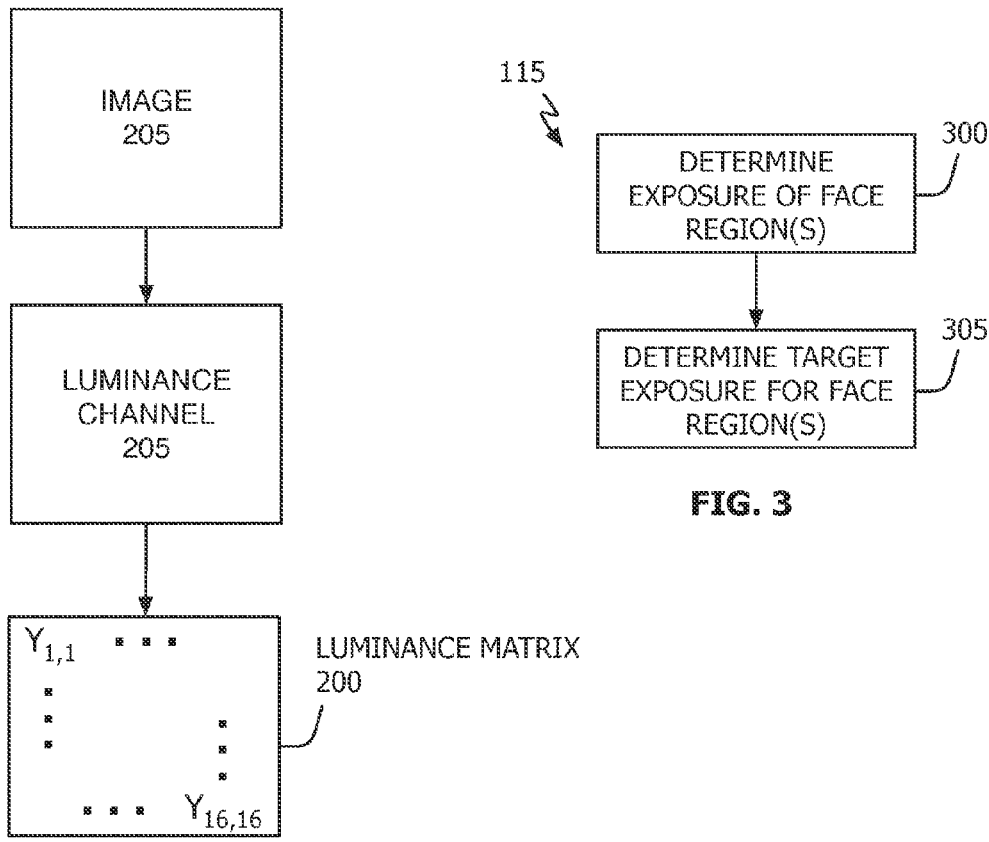

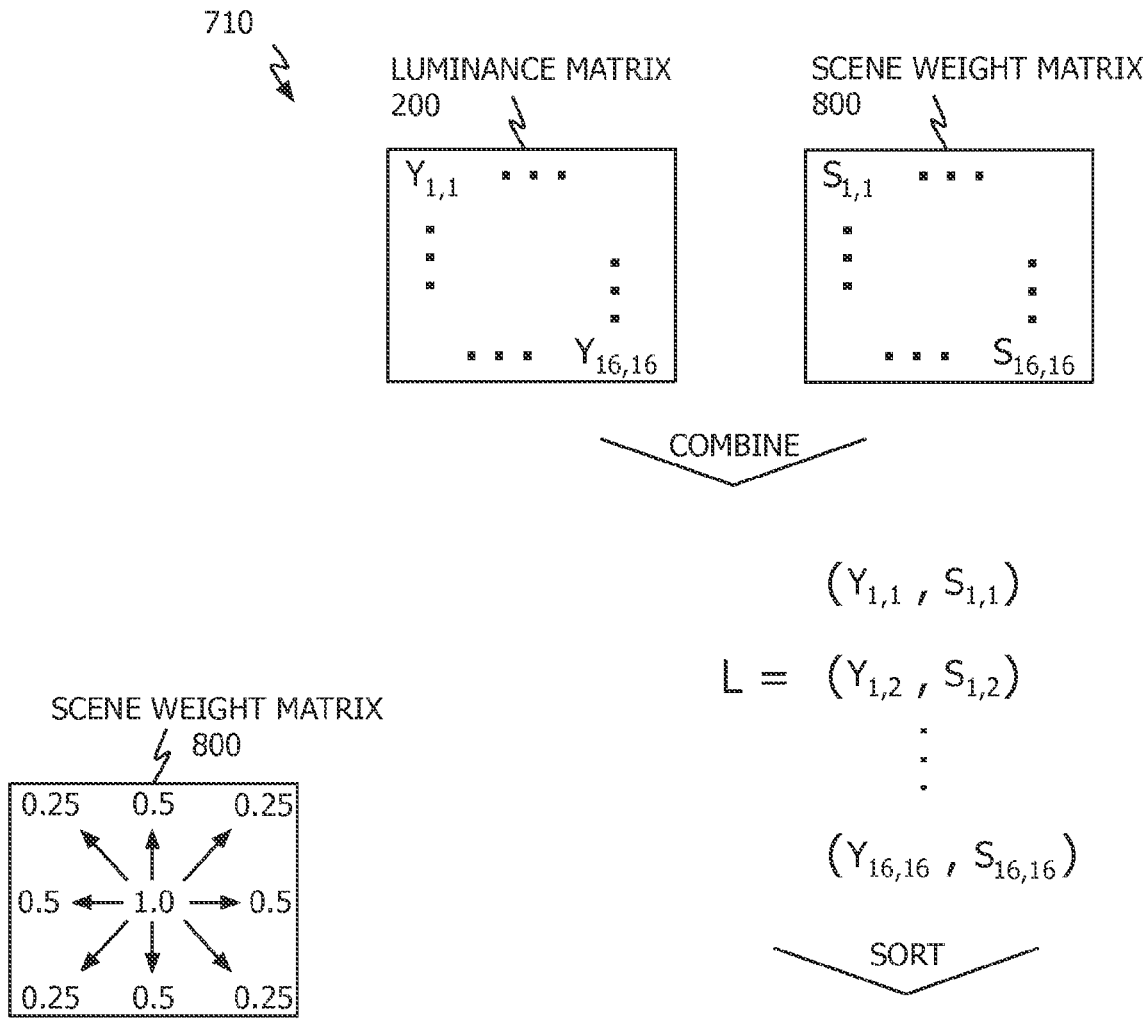
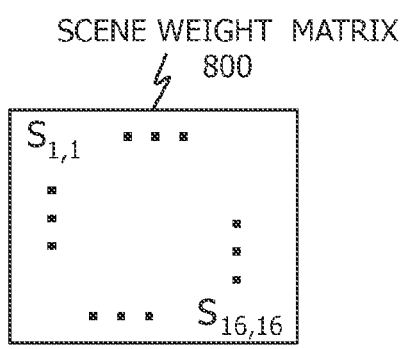
FIG. 8A
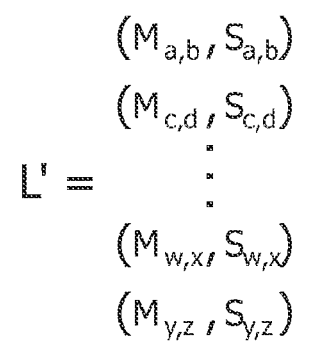
FIG. 8B
FIG. 9

AUTOMATIC EXPOSURE CONTROL BASED ON MULTIPLE REGIONS

BACKGROUND

This disclosure relates generally to the field of digital image processing. More particularly, but not by way of limitation, it relates to automatically adjusting the exposure of a digital image capture device by metering on multiple areas within an image. This application is related to the subject matter of the following commonly assigned applications: Ser. No. 12/755,542 filed Apr. 7, 2010; Ser. No. 12/786,710 filed May 25, 2010; Ser. No. 12/793,848 filed Jun. 4, 2010; and Ser. No. 12/912,943 filed Oct. 27, 2010 all of which are hereby incorporated by reference in their entirety.

Today, many personal electronic devices come equipped with digital cameras. Example personal electronic device of this sort include, but are not limited to, mobile telephones, personal digital assistants, portable music and video players and portable computer systems such as laptop, notebook and tablet computers. Often, these devices perform many functions, and, as a consequence, the digital image sensors included in these devices are often smaller than sensors in dedicated digital cameras. Further, the camera hardware in these devices often lacks sophisticated features sometimes found in larger, professional-style digital cameras such as manual exposure controls and manual focus. Thus, it is important that digital cameras in personal electronic devices be able to produce the most visually appealing images in a wide variety of lighting and scene situations with limited or no interaction from the user, as well as in a computationally and cost effective manner.

One feature that has been implemented in some digital cameras to create visually appealing images is known as "auto exposure." Auto exposure (AE) can be defined generally as any operation that automatically calculates and/or manipulates certain camera exposure parameters, e.g., exposure time, gain, or f-number, in such a way that the currently exposed scene is captured in a desirable manner. For example, there may be a predetermined "optimum brightness value" for a given scene that the camera will try to achieve by adjusting the camera's exposure value (generally taken to be 18% gray). Some AE algorithms calculate and/or manipulate a camera's exposure parameters such that a mean, center-weighted mean, median, or more complicated weighted value (as in matrix metering) of the image's brightness will equal a predetermined optimum brightness value in the resultant, auto exposed scene (again, generally taken to be 18% gray). AE algorithms may also be aided by face detection technologies. In these auto exposure algorithms, a camera will attempt to locate one or more human faces within the scene and tailor its exposure and/or focus parameters to the location of the face or faces in the scene. Such algorithms account for the fact that a good assumption in most consumer photography is that human faces are often the desired subject in an image and, thus, focusing on and exposing properly such faces will often lead to visually pleasing images.

To date, however, AE operations used in personal electronic devices have yielded less than optimal results. By way of example, metering either a scene as a whole or concentrating only on faces (as noted above) can yield images that are washed out due to bright backgrounds or shiny faces, or under-exposed due to large areas of darkness. As a consequence, there is a need for improved auto-exposure operations.

SUMMARY

In one embodiment the invention provides a method to automatically adjust the exposure setting parameters of a digital image capture device. The method includes obtaining a first digital image from the device using a first set of device exposure parameter values and determining, obtaining or generating image statistics (e.g., one or more histograms). A first (measured) exposure value may then be calculated for a first region of the first image based, at least in part, on the image's statistics. A target exposure value for the first region may also be calculated based, at least in part, on the image's statistics. A second (measured) exposure value may then be calculated for a second region of the first image based at least in part, on the image's statistics. As with the first region, a target exposure value for the second region may be calculated also based, at least in part, on the image's statistics. The first and second exposure values may be combined to form an overall exposure value and the first and second target exposure values may be combined to form an overall target exposure value for the first image. The overall (measured) exposure value and the overall target exposure value may be used to adjust the digital image capture device's exposure parameters such that a subsequently captured image's overall (measured) exposure value moves toward or approaches the first image's overall target exposure value.

In another embodiment, methods in accordance with the above may be implemented via computer program instructions or code that is tangibly embodied on storage media. When executed by one or more programmable control devices (e.g., processors), such instructions may implement the disclosed methods. The disclosed methods (and computer program code) may be implemented in a variety of digital electronic devices. Illustrative electronic devices include, but are not limited, to digital cameras, mobile telephones, personal digital assistants, portable music and video players and portable computer systems such as laptop, notebook and tablet computers.

BRIEF DESCRIPTION OF THE DRAWINGS

FIG. 2 shows a luminance matrix in accordance with one embodiment.

FIG. 3 shows, in flowchart form, a face metering determination operation in accordance with one embodiment.

FIG. 5 shows a partial weight matrix in accordance with one embodiment.

FIGS. 8A and 8B illustrate a scene weight matrix in accordance with one embodiment.

FIG. 9 shows the flow of operations to generate a sorted list of luminance-scene weight tuples in accordance with one embodiment.

DETAILED DESCRIPTION

Figure 1:
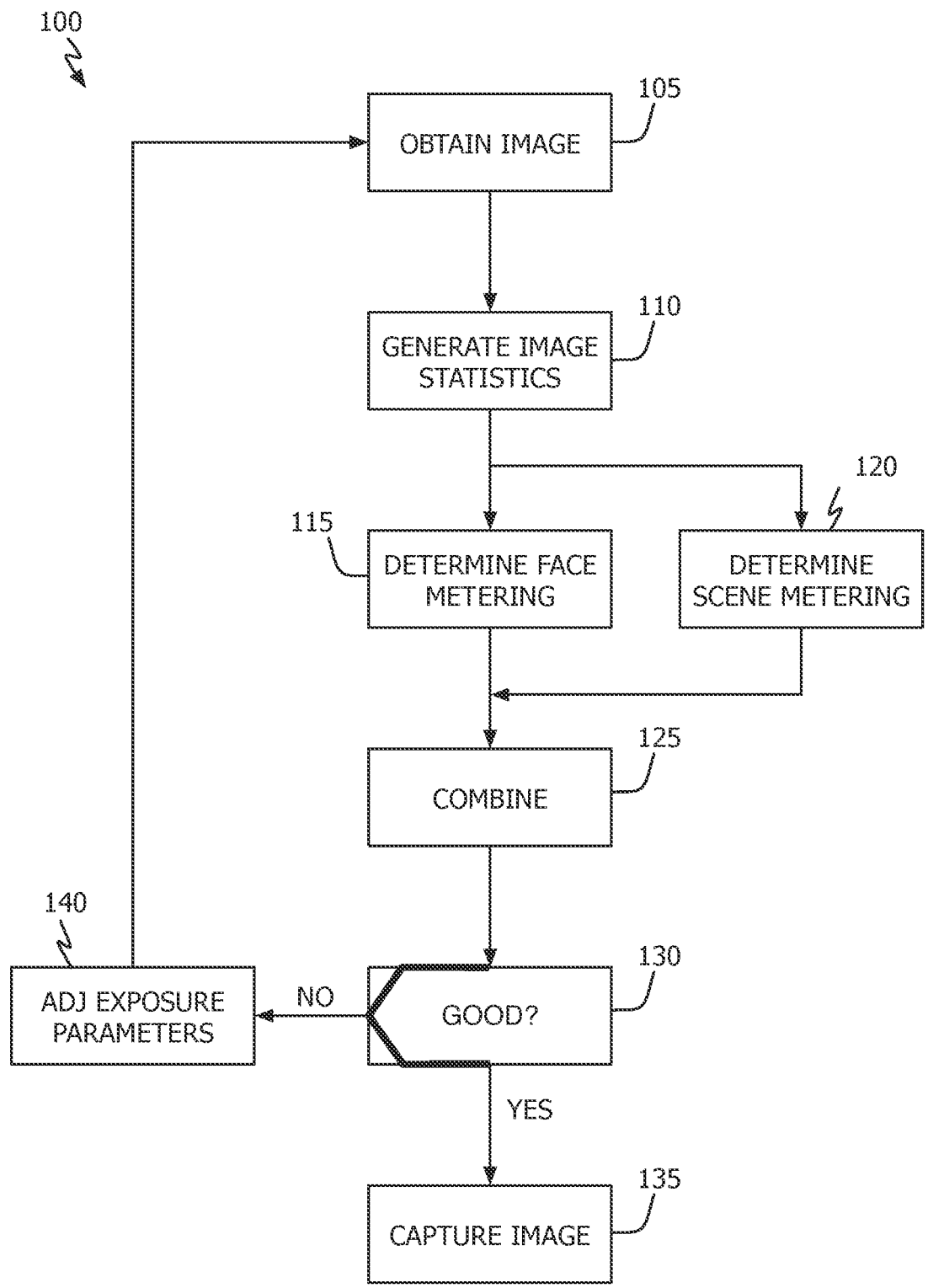
FIG. 1 shows, in flowchart form, an auto-exposure operation in accordance with one embodiment.

This disclosure pertains to systems, methods, and computer readable media for performing auto-exposure (AE) operations in a digital image capture device. Techniques are disclosed herein for automatically adjusting an image capture device's exposure settings by generating and then combining, in a dynamically weighted fashion, two sets of exposure values. One set of exposure values may be based on detected faces while the other set may be based on the image as a whole. Each set of exposure values may include a "measured" value and a "target" value, wherein each of these values may, in turn, be based on one or more (different) aspects of the image. Illustrative digital image capture devices in which the disclosed technology may be used include, but are not limited to, portable digital cameras, mobile telephones, personal digital assistants, mobile music and video devices, and portable computer platforms such as notebook and tablet computers.

In the following description, for purposes of explanation, numerous specific details are set forth in order to provide a thorough understanding of the inventive concept. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the image processing field having the benefit of this disclosure.

In one embodiment digital image capture operations in accordance with this disclosure combines two automatic exposure control techniques into a single implementation. The first technique identifies regions in an image that include human faces. These regions may be used to establish metered (measured) and target exposure values for the faces. The second technique identifies the image as either high-key or low-key and then uses this information to establish metered and target exposure values for the image as a whole (aka, the "scene"). The two sets of information may be combined in a dynamic or adaptive fashion and used to control an image capture device's exposure control settings (parameters).

Referring to FIG. 1, auto-exposure control operation 100 in accordance with one embodiment is shown in flowchart form. An image is initially obtained such as, for example, a preview image (block 105). Many digital image capture devices can obtain such images at between 5 and 30 frames per second (fps), although other frame rates are equally applicable to the present discussion. Once obtained, image statistics may be generated (block 110). In one embodiment image statistics may include one or more histograms, face detector output and a luminance matrix. It will be understood that a histogram illustrates the tonal distribution within an image. It will also be understood that face detector output may include a "face array"—an array of elements wherein each element identifies the location and size of a detected face (often times via a bounding box). Each element in a face array may also include information such as a value indicating the confidence that the detected face actually exists. A luminance matrix represents a course grained representation of the image's luminance (see discussion below).

Referring to FIG. 2, luminance matrix 200 in accordance with one embodiment may be generated by taking initial image 205 (e.g., the image obtained during the acts of block 105) and extracting its luminance channel 210. The luminance channel may in turn be partitioned into a number of blocks. In the example shown in FIG. 2, luminance matrix 200 comprises a 16-by-16 matrix whose individual values— $Y_{1,1}$ to $Y_{16,16}$—represent a measure of the image's luminance in the corresponding regions. By way of example, if image 205 comprises 2560-by-1920 pixels (i.e., 5 megapixels), luminance channel 210 will contain 2560-by-1920 luminance values and the value of each luminance matrix entry— $Y_{1,1}$ to $Y_{16,16}$—would be representative of 160-by-120 luminance values. In one embodiment, each value in luminance matrix 200 may represent the average of all luminance values in the corresponding area of luminance channel 210. In another embodiment, each value in luminance matrix 200 may represent the sum of all luminance values in the corresponding area of luminance channel 210. In some embodiments, the luminance matrix may be divided into fewer or more areas as computational resources and precision warrant.

Returning again to FIG. 1, image statistics may be used to determine face measured and face target exposure values (block 115) and the scene measured and scene target exposure values (block 120). These four values may be combined to generate overall measured and target exposure values (block 125). If the overall measured value is "close enough" to the overall target value (the "YES" prong of block 130), the image may be captured and tangibly stored in a memory (block 135). If the overall measured exposure value is not close enough to the overall target value (the "NO" prong of block 130), the image capture device's exposure parameters may be changed (block 140) whereafter the process may continue at block 105. In one embodiment, if the overall target and measured exposure values are within ⅛ of a stop the exposure may be considered "good enough." It will, of course, be recognized that the threshold used to determine that an image should be captured in accordance with block 135 may be dependent upon each implementation.

Referring to FIG. 3, measuring the image's face exposure in accordance with block 115 may be divided into two actions: determining a measured exposure value for the identified face regions (block 300); and determining a target exposure value for the identified face regions (block 305).

Figure 4:
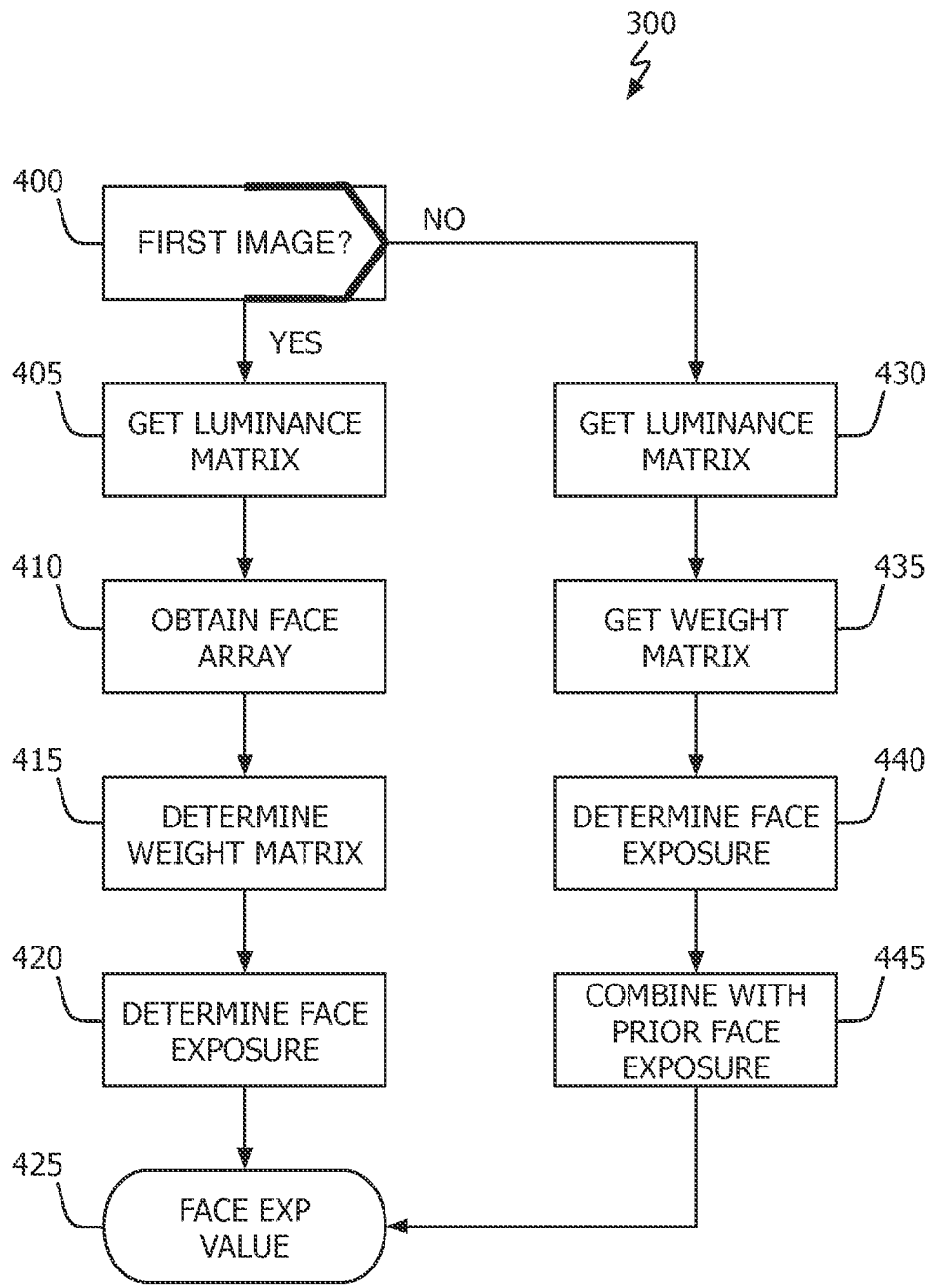
FIG. 4 shows, in flowchart form, a face exposure determination operation in accordance with one embodiment.

Referring now to FIG. 4, measured face exposure determination operation 300 in accordance with one embodiment is shown in flowchart form. A check may first be made to determine if the current image is the "first" image in a sequence (block 400). For example, the first frame after camera start-up may be processed in accordance with the YES prong of block 400. If the current image is the first image in a sequence (the "YES" prong of block 400), the image's luminance matrix and face array may be obtained (blocks 405 and 410). A weight matrix may then be determined (block 415). In general, a weight matrix is the same size as luminance matrix 200 wherein each value represents that portion in the corresponding region of the image in which a face has been detected.

By way of example only, consider FIG. 5 in which (partial) weight matrix 500 is shown with face bounding box 505 (placed in accordance with the face array). In one embodiment, each cell in weight matrix 500 may be assigned a value commensurate with that fraction of the cell in which the corresponding region of image 205 is overlapped with a detected face's bounding box. Given a single face bounding box as shown in FIG. 5, each cell in weight matrix 500 has been assigned a value of 0 (where no face has been detected—those cells outside bounding box 505), ¼ and ½ in those cells in which the bounding box partially covers the cell, and 1 for that cell entirely covered by the detected face's bounding box. More formally, the value assigned to each cell (e.g., value 510) in weight matrix 500 may be determined as follows:

$$W_{i,j} = \left( \frac{\text{Area of Cell}_{i,j} \text{ Covered by a Face}}{\text{Total Area of Cell}_{i,j}} \right), \quad \text{EQ. 1}$$

where $\text{Cell}_{i,j}$ represents the cell at the $i^{th}$ row and $j^{th}$ column of weight matrix 500, and $W_{i,j}$ represents the value of weight matrix 500 at $\text{Cell}_{i,j}$.

Returning to FIG. 4, for those implementations in which the number of cells in the luminance matrix equals the number of cells in the weight matrix, the current image's metered or measured face exposure (block 420) may be given as:

$$\text{face\_measured} = \sum_{\text{all } x,y} Y_{x,y} \times W_{x,y}, \quad \text{EQ. 2}$$

where $Y_{x,y}$ and $W_{x,y}$ are as described above. If the current image was the first image in a sequence, the face exposure value calculated in accordance with EQ. 2 (block 420) represents the image's measured face exposure (block 425).

If the current image is not the first image in a sequence (the "NO" prong of block 400), the luminance and previously generated weight matrix may be obtained (blocks 430 and 435) whereafter the current image's face exposure may be determined as described above with respect to block 420 and EQ. 2 (block 440). The current and prior images' measured face exposure values may then be combined (block 445). In general, prior and current measured face exposure values may be combined as follows:

$$\text{New Value} = (\text{Prior Value})\delta + (\text{Current Value})(1-\delta), \quad \text{EQ. 3}$$

where "Prior Value" represents the measured face exposure value for a prior image (e.g., the immediately prior image), "Current Value" represents the measured face exposure value for the current image, and $\delta$ represents a weighting factor. For an image capture device (e.g., a camera) obtaining images at a rate of 15 fps, it has been determined empirically that a good value for $\delta$ is 7/16. For a given image capture device, it has also been found that as the output of the image capture device's face detection system becomes more stable, $\delta$ may be made smaller.

Returning to FIG. 3, a target face exposure value in accordance with block 305 may be made dynamic (that is, dependent upon the captured image), or a specified constant. In an embodiment using this latter approach, an empirical analysis of professional and amateur images of individuals (images in which people are present such as, for example, portraits), has found that a target face exposure value of 0.25 (25% reflectance) provides high quality results. While the precise value of the target face exposure value depends upon many factors (e.g., the characteristics of the image capture device), it may also be noted that if additional information were known about the faces in an image (e.g., presence of eye glasses, beard and hair color, and ethnicity of the person(s) whose image has been captured), the target face exposure value may be made adaptive.

Figure 6:
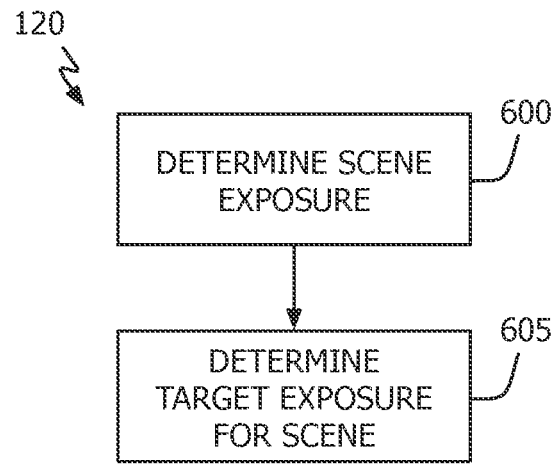
FIG. 6 shows, in flowchart form, a scene metering determination operation in accordance with one embodiment.

As in the determination of face exposure values (115), determination of scene metering in accordance with block 120 may be divided into two actions. Referring to FIG. 6, a first action may be to determine the exposure of the scene (600) and a second action may be to determine the target value of the scene (605).

Figure 7:
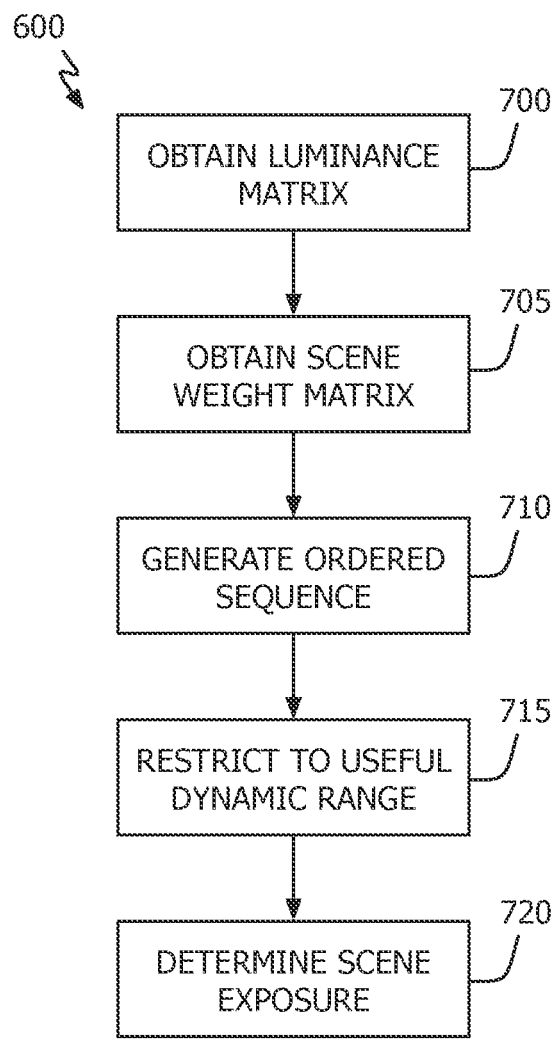
FIG. 7 shows, in flowchart form, a scene exposure determination operation in accordance with one embodiment.

Referring to FIG. 7, one embodiment of scene exposure determination operation 600 is shown in flowchart form. Initially, luminance and scene weight matrices may be obtained (blocks 700 and 705). As will be discussed in more detail below, a scene weight matrix may be used to determine which parts of the image (and, therefore, luminance channel 210) are more significant for determining a scene's exposure. Corresponding values from the luminance and scene weight matrices may then be combined into luminance-scene weight tuples and sorted based on their luminance value (block 710). Luminance-scene weight tuples that are excessively bright and/or excessively dark may then be eliminated (block 715). This operation restricts the luminance values used to determine a scene's exposure value to the image capture device's useful dynamic range. The remaining luminance-scene weight tuples may then be used to determine the scene's exposure (block 720).

In one embodiment a scene weight matrix may have values that represent a two-dimensional Gaussian. Referring to FIG. 8A, illustrative scene weight array 800 of this type may have a maximum value at its center (1.0), trailing off to 0.5 at the sides and 0.25 at the edges. It will be recognized that other distributions and other values may be applied—the general idea being to accentuate those areas in the image that are most likely to be important for determining the scene exposure and reducing the importance of other areas in the image. Referring to FIG. 8B, and in keeping with the example begun above, another representation of scene weight array 800 is shown as a 16-by-16 matrix. In one embodiment, scene weight matrix 800 may be generated once and used thereafter. In another embodiment, scene weight matrix 800 may be generated dynamically. For example, if an implementation does not want to pay the storage cost of scene weight matrix 800, these values could be generated on the fly.

Referring now to FIG. 9, operations in accordance with block 710 are illustrated as applied to example luminance and scene weight matrices 200 and 800. As shown, luminance and scene weight matrices may be combined to generate a list, L. Such a list may be represented as $L = (Y_{1,1}, S_{1,1}), (Y_{1,2}, S_{1,2}) \ldots (Y_{16,16}, S_{16,16})$. Once the luminance-scene weight tuples are formed, they may be sorted in accordance with their luminance value to generate a second list L'. This list may be represented as $L' = (Y_{a,b}, S_{a,b}) \ldots (Y_{y,z}, S_{y,z})$/where subscripts 'a' and 'b' represent that tuple having the lowest (darkest) luminance value and subscripts 'y' and 'z' represent that tuple having the highest (brightest) luminance value.

As described above with respect to block 715, some of these tuples may be eliminated from further consideration so that only luminance values that fall within the image capture device's useful dynamic range are used to determine the scene's exposure value. The resulting list, designated L", may be represented as $L'' = (Y_{\alpha,\beta}, S_{\alpha,\beta}) \ldots (Y_{\gamma,\delta}, S_{\gamma,\delta})$. In one embodiment, low luminance tuples may be removed until the total (scene) weight of the removed "dark" tuples equals a first threshold (e.g., 3) and high luminance tuples may be removed until the total (scene) weight of the removed "bright" tuples equals a second threshold (e.g., 10). It will of course be recognized that the thresholds used will depend on a number of factors including the image capture device's particular characteristics and the distribution and range of values used in the scene weight matrix. In one embodiment, list L″ may be used to determine the scene's measured exposure value as follows:

$$\text{scene measured} = \sum_{\text{all } i,j \text{ in } L''} Y_{i,j} \times S_{i,j} \qquad \text{EQ. 4}$$

where 'i' and 'j' range over all of the elements in list L″—that is, after acts in accordance with block 715.

As before with respect to determination of the measured face exposure value (see discussion above), if the current image is not the first image in a sequence of images, the current and prior scene measured exposures may be combined in any manner that makes sense to a particular implementation. In one embodiment multiple images may be used to generate a scene measured exposure value (in accordance with EQ. 3 above, for example) with the current image treated as discussed above, while each successive older image is given less weight.

Figure 10:
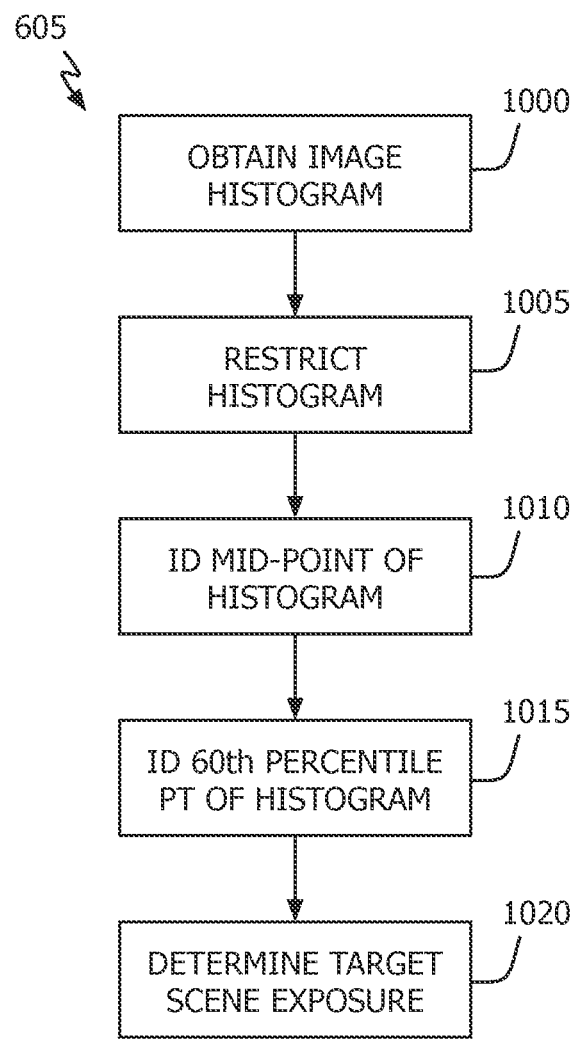
FIG. 10 shows, in flowchart form, a scene target exposure determination operation in accordance with one embodiment.

Referring to FIG. 10, an operation to determine a scene's target exposure is shown in accordance with one embodiment. Initially the captured image's histogram is obtained (block 1000). In one embodiment, the histogram may be generated by the image capture device when the image is captured (see FIG. 1 at block 110). The histogram may then be restricted to coincide with the image capture device's useful dynamic range (block 1005). The mid-point and 60th percentile point of the restricted histogram may then be identified (blocks 1010 and 1015). As well be discussed in more detail below, these points may be used in a novel manner to determine if the captured image is high-key or low-key. These points and the histogram itself may be used to determine a target scene exposure value (block 1020).

Figure 11:
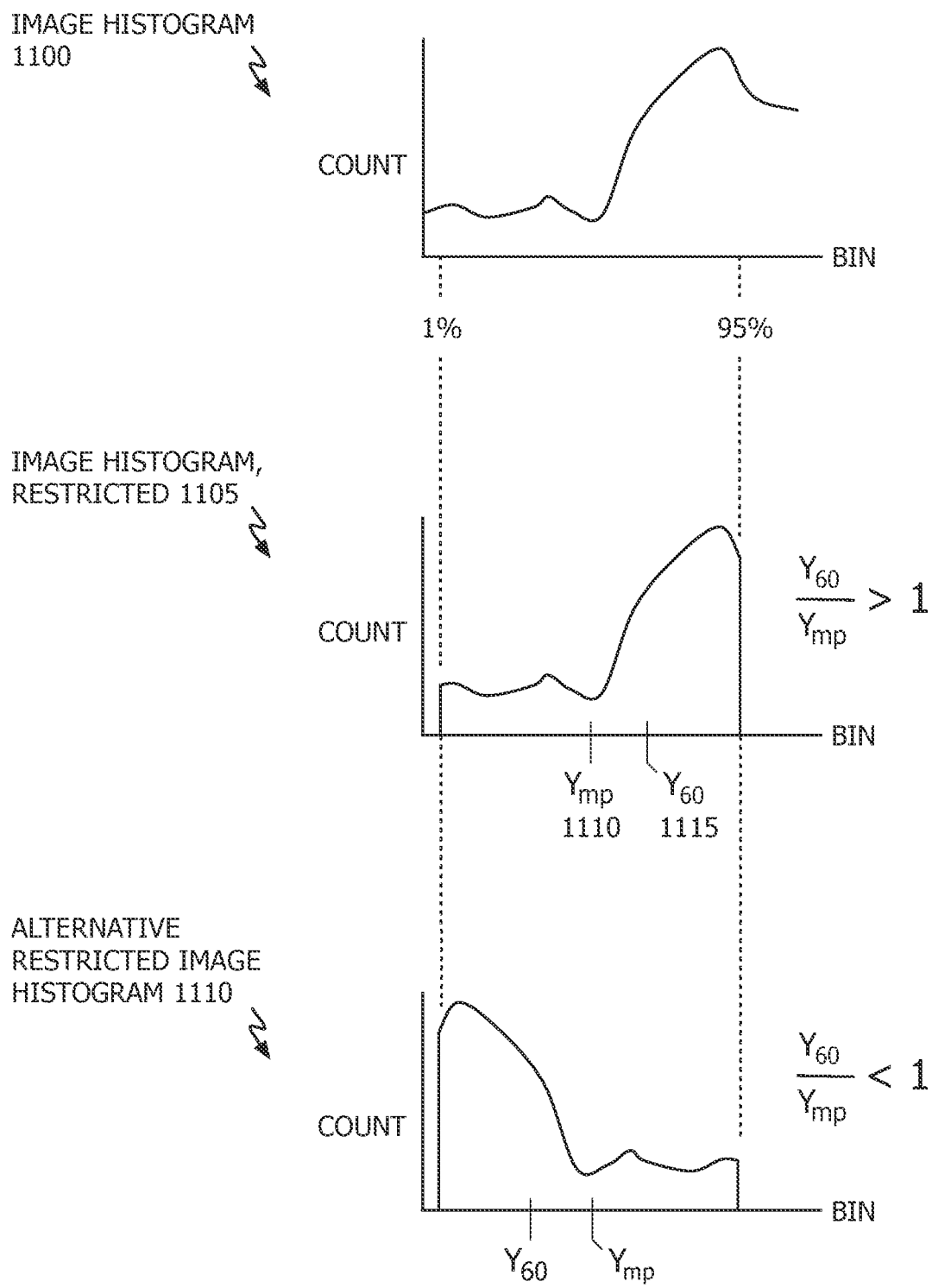
FIG. 11 illustrates various image histograms in accordance with one embodiment.

Referring now to FIG. 11, image histogram 1100 is shown as it might look after acts in accordance with block 1000 (see, also, FIG. 1 at block 110). Histogram 1105 represents histogram 1100 trimmed at the lower and upper ends to, for example, remove noise at the dark end and both noise and specular highlights at the bright end (see block 1005). In one embodiment, the histogram may be trimmed at the dark end at the 1st percentile point and the 95th percentile point at the bright end. It will be recognized that trimming the histogram as described here may be done to a larger or lesser degree (or not at all), depending upon the characteristics of the particular image capture device. Restricted histogram 1105 has been annotated with its mid-point (50th percentile) 1110 and 60th percentile point 1115 in accordance with blocks 1010 and 1015.

It has been found that the ratio of a histogram's luminance at the 60th percentile point ($Y_{60}$) and the mid-point ($Y_{mp}$) provides an indication of whether the image is high-key or low-key. More specifically, $$\text{if } \frac{Y_{60}}{Y_{mp}} \le 1 \qquad \text{EQ. 5A}$$

the image may be considered low-key, and $$\text{if } \frac{Y_{60}}{Y_{mp}} > 1 \qquad \text{EQ. 5B}$$

the image may be considered high-key. In accordance with block 605, the value of this ratio may also be used as a scaling factor as set forth in Table 1. As used in Table

TABLE 1

Scale Pseudo-Code

Let $\frac{Y_{60}}{Y_{mp}}$ = initial_scale;

if (initial_scale < Min_Threshold)
    scale = Min_Threshold;
else if (initial_scale > Max_Threshold)
    scale = Max_Threshold;
else
    scale = initial_scale;

1, the terms "Max_Threshold" and "Min_Threshold" represent tuning parameters that may be used to control how aggressively the image capture device's exposure settings may be adjusted during automatic exposure operations (e.g., operation 100). In one embodiment Min_Threshold may be set to 0.5 (implying a reduction in exposure by half, 1 stop down) and Max_Threshold may be set to 2.0 (implying a doubling of exposure, 1 stop up). Referring again to FIG. 11, histogram 1120 has been presented to illustrate the fact that the location of a histogram's mid-point and 60th percentile point may change as the "shape" of the histogram changes.

Given the above background, a scene target exposure value in accordance with one embodiment may be generated in accordance with the pseudo-code listing in Table 2.

TABLE 2

Scene Target Exposure Pseudo-Code if ( scale ≤ 1 )    // low-key case
{
    scene_target = (0.18)(scale)($d_{dark}$) + (0.18)(1 − $d_{dark}$);
}
else    // high-key case
{
    estimate = (0.18)(scale)($d_{bright}$) + (0.18)(1 − $d_{bright}$);
    C = (No. Blown − out Pixels);
    C' = f (C);
    scene_target = (estimate)(1 − C') + (0.18)(C');
}

Referring to the low-key case, the 0.18 value represents an accepted goal exposure of 18% reflectance. The tuning parameter $d_{dark}$ may be used to set how much to honor the determined scale value. It will be recognized that $d_{dark}$ may be empirically determined in accordance with the visual goals of a particular implementation and accounting for the specific characteristics of the image capture device.

Figure 12:
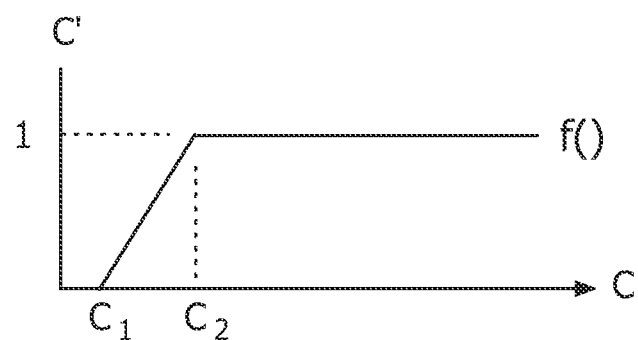
FIG. 12 shows a pixel blown-out scaling function in accordance with one embodiment.

Referring now to the high-key case, an initial estimate may be calculated in the same manner as the scene's target value for the low-key case. The difference being use of the tuning parameter $d_{bright}$ which may be determined in the same manner, and serves substantially the same purpose, as $d_{dark}$. (In some embodiments, tuning parameters $d_{dark}$ and $d_{bright}$ may be a common value.) To guard against causing to many blown-out pixels in an imaged determined to be high-key, the number of blown-out pixels in the image may be determined (represented by C) and scaled by function f( ) in accordance with an implementation's acceptable range. By way of example, consider FIG. 12 in which an example function f( ) is shown. In this embodiment, if the number of blown-out pixels is less than $C_1$ (e.g., approximately 1% to 8%), the conclusion that the image is indeed high-key is accepted without reservation. If, on the other hand, the number of blown-out pixels is equal to, or greater than, $C_2$ (e.g., approximately 20% to 30%), the conclusion that the image is high-key may be rejected. This may be seen in Table 2 where the scene target exposure devolves to the presumed standard exposure of 18% when C'=1. While FIG. 12 illustrates the relationship between C and C' as linear, this is not necessary. The precise nature of this relationship may vary from implementation to implementation.

Figure 13:
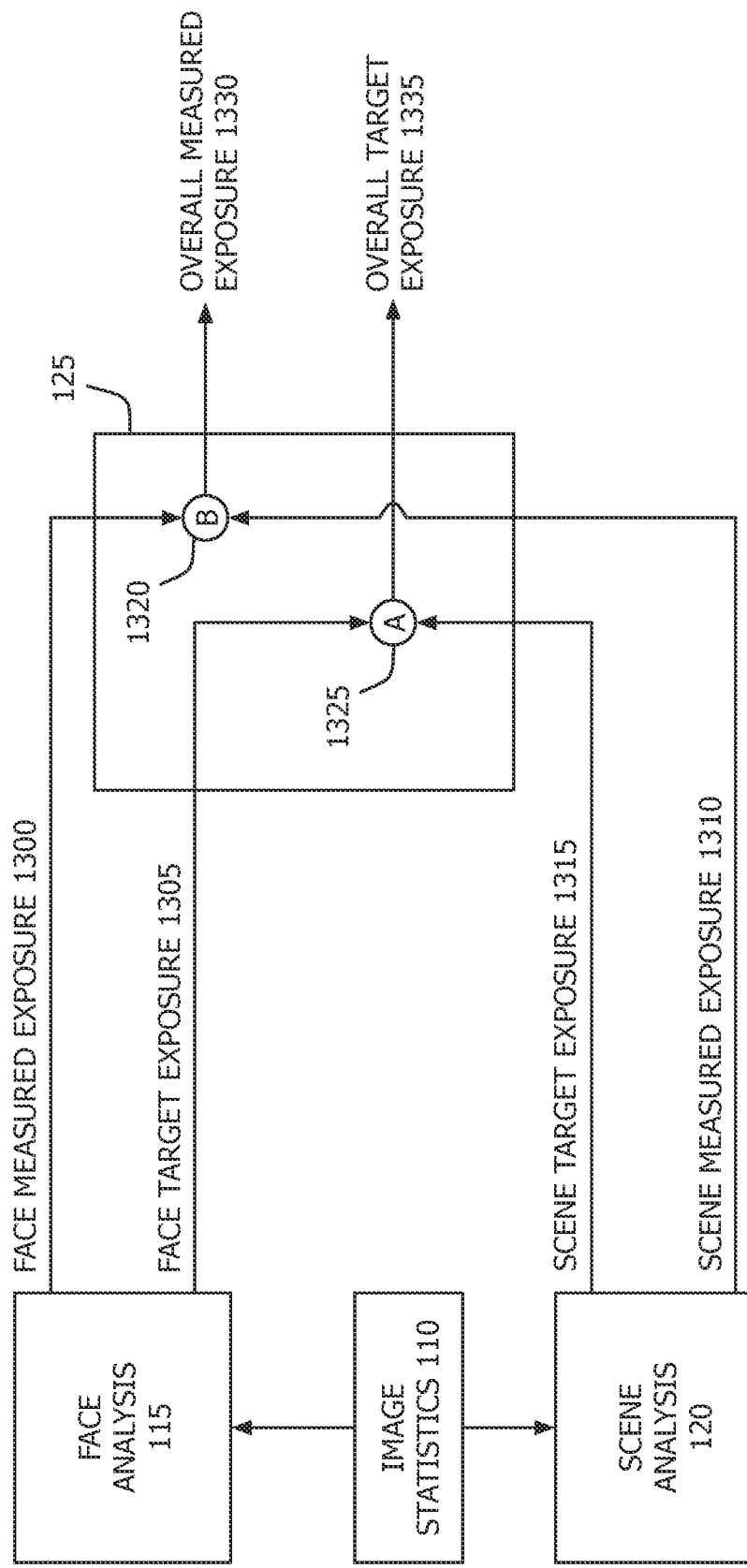
FIG. 13 shows, in block diagram form, an approach to combine measured and target exposure values in accordance with one embodiment.

Referring to FIG. 13, to recap, image statistics may be generated in accordance with block 110. Face analysis in accordance with block 115 generates face measured exposure value 1300 (see EQs. 2 and 3 and block 300) and face target exposure value 1305 (see block 305). In like fashion, scene analysis in accordance with block 120 generates scene measured exposure value 1310 (see EQ. 4, block 600 and FIG. 7) and scene target exposure value 1315 (see Table 2, block 605 and FIG. 10). These four values may be combined as shown at 1320 and 1325 in accordance with block 125 to generate an overall measured exposure value 1330 and an overall target exposure value 1335 which may then be used to drive the image capture device's automatic exposure control mechanism. In one embodiment, operation 1320 may be implemented to generate overall measured exposure 1330 as follows:

$$\text{overall\_measured} = (f_{meas} \times b_{face}) + s_{meas}(1 - b_{face}), \quad \text{EQ. 6}$$

and operation 1325 may be implemented to generate overall target exposure 1335 as follows:

$$\text{overall\_target} = (f_{tgt} \times b_{face}) + s_{tgt}(1 - b_{face}) \quad \text{EQ. 7}$$

where $f_{meas}$ represents the image's measured face exposure value in accordance with block 300 (1300), $f_{tgt}$ represents the image's target face exposure value in accordance with block 305 (1305), $s_{meas}$ represents the image's measured scene exposure value in accordance with block 600 (1310), $s_{tgt}$ represents the image's target scene exposure value in accordance with block 605 (1315) and $b_{face}$ represents a blend factor.

Figure 14:
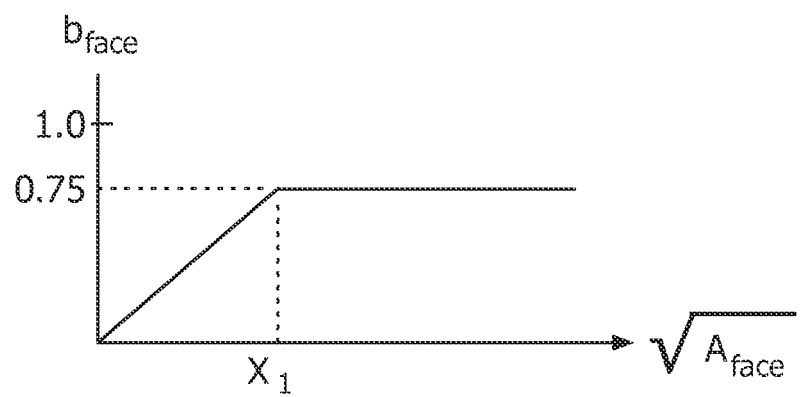
FIG. 14 shows a face-area based blending factor relationship in accordance with one embodiment.

In one embodiment, blend factor $b_{face}$ may be a function of the area of the image in which faces have been detected ($A_{face}$). One way to determine blending factor $b_{face}$ based on this approach is to relate $b_{face}$ to $A_{face}$ through a piece-wise linear function as shown in FIG. 14. In that particular embodiment, $$A_{face} = \sum_{all\ faces} \text{Area(face)}, \quad \text{EQ. 8}$$

where Area(face) represents an area of the image in which a single face was detected. As shown in FIG. 14, $b_{face}$ is linearly related to the square-root of the total face area ($\sqrt{A_{face}}$) up to a value $x_1$ (e.g., $b_{face}$=0.75), after which the blend factor is limited or capped. Under this regime, a face twice as far away would get ¼ of the weight. The cap at 0.75 (see FIG. 14) may be chosen to ensure that the scene metering operation always contributes somewhat to the overall exposure determination (i.e., in the current embodiment, the scene exposure is at least given a weight of 0.25). It is noted that both the particular function and the illustrated values shown in FIG. 14 may vary from implementation to implementation.

One unexpected observation is that metering for faces may be significantly different than metering for the scene as a whole. These differences cannot be noted or used to adjust an image capture device's exposure settings unless the device's auto-exposure operation is designed to make this distinction.

Figure 15:
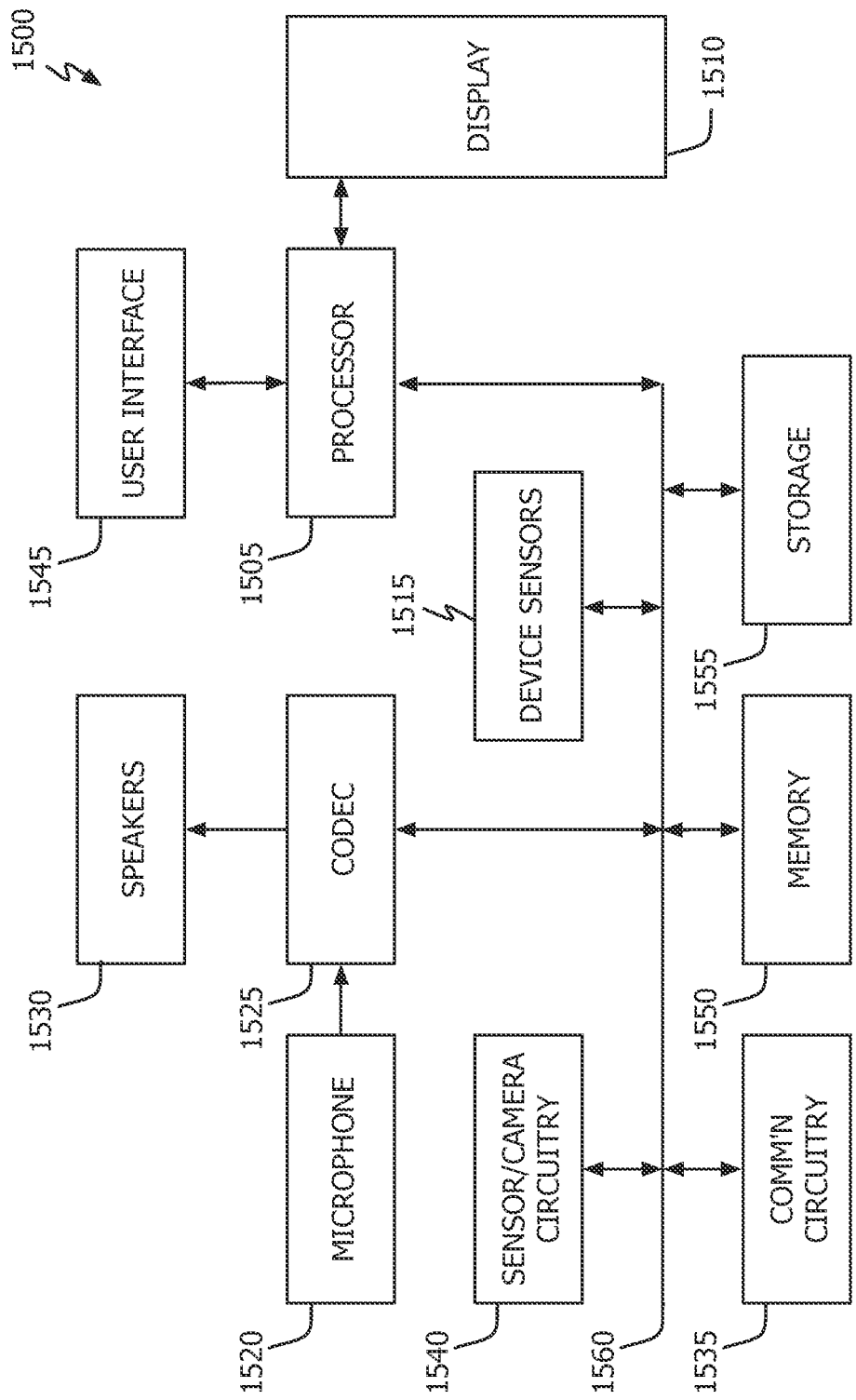
FIG. 15 shows, in block diagram form, an architecture for a digital electronic device incorporating image capture capability in accordance with one embodiment.

Referring now to FIG. 15, a simplified functional block diagram of representative personal electronic device 1500 incorporating digital image capture capability is shown according to one embodiment. Electronic device 1500 may include processor 1505, display 1510, device sensors 1515 (e.g., proximity sensor/ambient light sensor), microphone 1520, audio/video codecs 1525, speaker 1530, communications circuitry 1535, image sensor with associated camera hardware 1540, user interface 1545, memory 1550, storage device 1555, and communications bus 1560.

Processor 1505 may be any suitable programmable control device and may control the operation of many functions, such as the generation and/or processing of image metadata, as well as other functions performed by electronic device 1500. Processor 1505 may drive display 1510 and may receive user inputs from the user interface 1545. An embedded processor, such a Cortex® A8 with the ARM® v7-A architecture, may provide a versatile and robust programmable control device that may be utilized for carrying out the disclosed techniques. (CORTEX® and ARM® are registered trademarks of the ARM Limited Company of the United Kingdom.)

Memory 1550 may include one or more different types of storage media used by processor 1505 to perform device functions. For example, memory 1550 may include cache, read-only memory (ROM), and/or random access memory (RAM). Communications bus 1560 may provide a data transfer path for transferring data to, from, or between at least storage device 1555, memory 1550, processor 1505, and camera hardware 1540. User interface 1545 may allow a user to interact with electronic device 1500. For example, user interface 1545 can take a variety of forms, such as a button, keypad, dial, a click wheel, or a touch screen.

Storage device 1555 may store media (e.g., image and video files), computer program instructions or software, preference information, device profile information, and any other suitable data. Storage device 1555 may include one more storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Memory 1550 and storage 1555 may be used to tangibly retain computer program instructions or code organized into one or more modules and written in any computer program language desired. When executed by, for example, processor 1505 such computer program code may implement one or more of the methods described herein.

In one embodiment, personal electronic device 1500 may be capable of processing and displaying media such as image and video files. For example, personal electronic device 1500 may be a device such as such a mobile phone, personal data assistant (PDA), portable music player, portable digital camera, laptop, desktop, and tablet computer, or other suitable personal device.

Various changes in the materials, components, circuit elements, as well as in the details of the illustrated operational methods are possible without departing from the scope of the following claims. For instance, processor 1505 may be implemented using two or more program control devices communicatively coupled. Each program control device may include the above-cited processors, special purpose processors such as graphics processing units and custom designed state machines that may be embodied in a hardware device such as an application specific integrated circuits (ASICs) and field programmable gate array (FPGAs).

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
   capture a first digital image of a scene using a first exposure value;
   obtain image statistics for the first digital image;
   determine a measured exposure value of an identified face in the digital image based, at least in part, on the image statistics;
   determine a measured exposure value of the scene based, at least in part, on the image statistics;
   determine a target exposure value of the identified face based, at least in part, on the image statistics;
   determine a target exposure value of the scene based, at least in part, on the image statistics;
   determine an overall measured exposure value based, at least in part, on the measured exposure value of the scene and the measured exposure value of the identified face;
   determine an overall target exposure value based, at least in part, on the target exposure value of the scene and the target exposure value of the identified face; and
   adjust the first exposure value to create a second exposure value based, at least in part, on the overall measured exposure value and the overall target exposure value.

2. The non-transitory program storage device of claim 1, wherein the instructions to capture a first digital image comprise instructions to cause the one or more processors to capture a first digital image prior to receiving a user-initiated capture command signal.

3. The non-transitory program storage device of claim 1, wherein the instructions to obtain image statistics comprise instructions to cause the one or more processors to obtain face information identifying one or more areas in the first digital image in which a face has been detected.

4. The non-transitory program storage device of claim 3, wherein the instructions to obtain image statistics further comprise instructions to cause the one or more processors to obtain a plurality of luminance values, wherein each luminance value corresponds to a region of the first digital image and is indicative of a luminance for that region, the plurality of luminance values collectively forming a first luminance matrix.

5. The non-transitory program storage device of claim 4, wherein the instructions to determine a measured exposure value of an identified face comprise instructions to cause the one or more processors to determine a measured exposure value of an identified face based, at least in part, on the face information and the first luminance matrix.

6. The non-transitory program storage device of claim 4, wherein the instructions to determine a measured exposure value of the scene comprise instructions to cause the one or more processors to determine a measured exposure value of the scene based, at least in part, on the luminance matrix.

7. The method of claim 1, wherein the instructions to determine a target exposure value of an identified face comprise instructions to cause the one or more processors to obtain a constant value.

8. The non-transitory program storage device of claim 1, wherein the instructions to determine a target exposure of the scene comprise instructions to cause the one or more processors to:
   obtain a histogram of the first digital image;
   identify the first digital image as low-key; and
   determine a target exposure value of the scene based, at least in part, on the histogram and a predetermined exposure value.

9. The non-transitory program storage device of claim 1, wherein the instructions to determine a target exposure value of the scene comprise instructions to cause the one or more processors to:
   obtain a histogram of the first digital image;
   identify the first digital image as high-key;
   determine the number of blown-out pixels in the first digital image based, at least in part, on the histogram; and
   determine a target exposure value of the scene based, at least in part, on the number of blown-out pixels in the first digital image and a predetermined exposure value.

10. The non-transitory program storage device of claim 1, wherein the instructions to determine an overall measured exposure value comprise instructions to cause the one or more processors to generate a weighted sum of the measured exposure value of the identified face and the measured exposure value of the scene.

11. The non-transitory program storage device of claim 10, wherein the overall measured exposure value is further based, at least in part, on an area of the identified face with respect to an area of the first digital image.

12. The non-transitory program storage device of claim 1, wherein the instructions to determine an overall target exposure value comprise instructions to cause the one or more processors to generate a weighted sum of the target exposure value of the identified face and the target exposure value of the scene.

13. The non-transitory program storage device of claim 1, wherein the instructions to adjust the first exposure value to create the second exposure value comprise instructions to cause the one or more processors to adjust the first exposure value so that a subsequent digital image's exposure value is closer to the overall target exposure value than the first digital image's exposure value.

14. The non-transitory program storage device of claim 1, wherein the instructions to adjust the first exposure value comprise instructions to cause the one or more processors to:
   determine a difference value between the overall measured exposure value and the overall target exposure value; and
   adjust the first exposure value so that a subsequent digital image's exposure value is closer to the overall target exposure value than the first digital image's exposure value when the determined difference is greater than a threshold value.

15. The non-transitory program storage device of claim 14, wherein the threshold value is approximately $1/8^{th}$ stop.

16. The non-transitory program storage device of claim 1, further comprising instructions to cause the one or more processors to:
   capture a second digital image of the scene using the second exposure value; and
   store the second digital image in a memory.

17. A digital image capture method, comprising:
- capturing a first digital image of a scene using a first exposure value;
- obtaining image statistics for the first digital image;
- determining a measured exposure value of an identified face in the digital image based, at least in part, on the image statistics;
- determining a measured exposure value of the scene based, at least in part, on the image statistics;
- determining a target exposure value of the identified face based, at least in part, on the image statistics;
- determining a target exposure value of the scene based, at least in part, on the image statistics;
- determining an overall measured exposure value based, at least in part, on the measured exposure value of the scene and the measured exposure value of the identified face;
- determining an overall target exposure value based, at least in part, on the target exposure value of the scene and the target exposure value of the identified face; and
- adjusting the first exposure value to create a second exposure value based, at least in part, on the overall measured exposure value and the overall target exposure value.

18. The method of claim 17, wherein the act of obtaining image statistics comprises:
- obtaining face information identifying one or more areas in the first digital image in which a face has been detected; and
- obtaining a plurality of luminance values, wherein each luminance value corresponds to a region of the first digital image and is indicative of a luminance for that region, the plurality of luminance values collectively forming a first luminance matrix.

19. The method of claim 18, wherein the act of determining a measured exposure value of an identified face comprises determining the measured exposure value of the identified face based, at least in part, on the face information and the first luminance matrix.

20. The method of claim 17, wherein the act of determining a target exposure of the scene comprises:
- obtaining a histogram of the first digital image;
- identifying the first digital image as low-key; and
- determining a target exposure value of the scene based, at least in part, on the histogram and a predetermined exposure value.

21. The method of claim 17, wherein the act of determining a target exposure value of the scene comprises:
- obtaining a histogram of the first digital image;
- identifying the first digital image as high-key;
- determining the number of blown-out pixels in the first digital image based, at least in part, on the histogram; and
- determining a target exposure value of the scene based, at least in part, on the number of blown-out pixels in the first digital image and a predetermined exposure value.

22. The method of claim 17, wherein the act of adjusting the first exposure comprises:
- determining a difference value between the overall measured exposure value and the overall target exposure value; and
- adjusting the first exposure value so that a subsequent digital image's exposure value is closer to the overall target exposure value than the first digital image's exposure value when the determined difference is greater than a threshold value.

23. The method of claim 17, further comprising:
- capturing a second digital image of the scene using the second exposure value; and
- storing the second digital image in a memory.

24. A digital image capture device, comprising:
- a lens system;
- an image sensor operatively coupled to the lens system;
- one or more processors coupled to the lens system and the image sensor; and
- memory coupled to the image sensor and the one or more processors, the memory configured to store instructions to cause the one or more processors to
- capture, using the image sensor and the lens system, a first digital image of a scene using a first exposure value;
- obtain image statistics for the first digital image;
- determine a measured exposure value of an identified face in the digital image based, at least in part, on the image statistics;
- determine a measured exposure value of the scene based, at least in part, on the image statistics;
- determine a target exposure value of the identified face based, at least in part, on the image statistics;
- determine a target exposure value of the scene based, at least in part, on the image statistics;
- determine an overall measured exposure value based, at least in part, on the measured exposure value of the scene and the measured exposure value of the identified face;
- determine an overall target exposure value based, at least in part, on the target exposure value of the scene and the target exposure value of the identified face;
- adjust the first exposure value to create a second exposure value based, at least in part, on the overall measured exposure value and the overall target exposure value;
- capture a second digital image using the second exposure value; and
- store the second digital image in the memory.

* * * * *

UNITED STATES PATENT AND TRADEMARK OFFICE
CERTIFICATE OF CORRECTION

PATENT NO.         : 8,836,851 B2
APPLICATION NO.    : 13/151165
DATED              : September 16, 2014
INVENTOR(S)        : Ralph Brunner Page 1 of 1

It is certified that error appears in the above-identified patent and that said Letters Patent is hereby corrected as shown below:

In the Claims
Column 11, line 67 (Claim 6, line 5), insert the word --first-- before the phrase "luminance matrix".
Column 12, line 6 (Claim 12, line 2), insert the word --value-- after the phrase "a target exposure".
Column 13, line 39 (Claim 20, line 2), insert the word --value-- after the phrase "a target exposure".
Column 14, line 5 (Claim 22, line 2), insert the word --value-- after the phrase "the first exposure".

Signed and Sealed this
Seventeenth Day of February, 2015

Michelle K. Lee
*Deputy Director of the United States Patent and Trademark Office*